(12) United States Patent
Marggraff et al.

(10) Patent No.: US 11,409,359 B1
(45) Date of Patent: Aug. 9, 2022

(54) SYSTEMS AND METHODS FOR COLLECTIVE CONTROL OF VIRTUAL OBJECTS

(71) Applicant: KINOO, Inc., Mountain View, CA (US)

(72) Inventors: Lewis James Marggraff, Lafayette, CA (US); Nelson George Publicover, Bellingham, WA (US)

(73) Assignee: KINOO, Inc., Mountain View, CA (US)

( * ) Notice: Subject to any disclaimer, the term of this patent is extended or adjusted under 35 U.S.C. 154(b) by 0 days.

(21) Appl. No.: 17/531,571

(22) Filed: Nov. 19, 2021

Related U.S. Application Data

(63) Continuation-in-part of application No. 17/396,643, filed on Aug. 6, 2021, now Pat. No. 11,334,178.

(60) Provisional application No. 63/257,494, filed on Oct. 19, 2021.

(51) Int. Cl.

| | |
|---|---|
| *G06F 3/01* | (2006.01) |
| *G06F 3/04815* | (2022.01) |
| *G06F 3/0346* | (2013.01) |
| *G06T 19/00* | (2011.01) |
| *G06V 20/20* | (2022.01) |
| *G06T 7/20* | (2017.01) |
| *G06F 3/0488* | (2022.01) |

(52) U.S. Cl.
CPC ............ *G06F 3/011* (2013.01); *G06F 3/0346* (2013.01); *G06F 3/0488* (2013.01); *G06F 3/04815* (2013.01); *G06T 7/20* (2013.01); *G06T 19/006* (2013.01); *G06V 20/20* (2022.01)

(58) Field of Classification Search
CPC ................................ G06F 3/038; G06F 3/011
See application file for complete search history.

(56) References Cited

U.S. PATENT DOCUMENTS

| | | | |
|---|---|---|---|
| 11,030,814 B1 * | 6/2021 | Kwiatkowski | ......... H04N 5/272 |
| 11,315,301 B1 * | 4/2022 | Lim | ...................... G06V 40/161 |
| 2003/0142065 A1 * | 7/2003 | Pahlavan | .............. G06F 3/0346 |
| | | | 345/156 |
| 2013/0217498 A1 * | 8/2013 | Wang | ...................... A63F 13/42 |
| | | | 463/37 |

(Continued)

*Primary Examiner* — Chun-Nan Lin
(74) *Attorney, Agent, or Firm* — William A. English; Vista IP Law Group LLP

(57) ABSTRACT

Systems and methods are described to enact machine-based, collective control by two individuals of one or more displayed virtual objects. Collective interactions may be implemented by combining an ability to specify one or more locations on a touch-sensitive display using one or more digits of a first user with an ability to monitor a portable, handheld controller manipulated by the other user. Alternatively or in addition, pointing by the first hand to the one or more locations on a display may be enhanced by a stylus or other pointing device. The handheld controller may be tracked within camera-acquired images by following camera-trackable controller components and/or by acquiring measurements from one or more embedded internal measurement units (IMUs). Optionally, one or more switches or sensors may be included within the handheld controller, operable by one or more digits of the second hand to enable alternative virtual object display and/or menu selections during collective interactions.

25 Claims, 10 Drawing Sheets

(56) References Cited

U.S. PATENT DOCUMENTS

| | | | |
|---|---|---|---|
| 2013/0314320 A1* | 11/2013 | Hwang | G06F 3/0346 345/158 |
| 2020/0341538 A1* | 10/2020 | Zhu | A63H 33/102 |
| 2020/0368616 A1* | 11/2020 | Delamont | A63F 13/213 |
| 2021/0096726 A1* | 4/2021 | Faulkner | G06F 1/1686 |
| 2021/0233272 A1* | 7/2021 | Jiang | G09G 5/12 |

* cited by examiner

SYSTEMS AND METHODS FOR COLLECTIVE CONTROL OF VIRTUAL OBJECTS

RELATED APPLICATION DATA

The present application claims benefit of provisional application Ser. No. 63/257,494, filed Oct. 19, 2021, and is a continuation-in-part of co-pending application Ser. No. 17/396,643, filed Aug. 6, 2021, the entire disclosures of which are expressly incorporated by reference herein.

FIELD OF THE INVENTION

The present application relates generally to systems and methods for two individuals to collectively interact with one or more virtual objects in a substantially simultaneous fashion. Systems and methods utilize techniques within the fields of computer programming, graphical display, touch-sensitive screens, image acquisition, device controllers, graphical user interfaces (GUIs), cognition, human motor control and human-machine interactions. Shared or collective control of virtual objects may allow GUI designers an expanded array of human-machine interaction modalities based on natural human behaviors and interplay. Systems and methods may provide users with intuitive machine interfaces to rapidly and/or accurately interact with virtual objects in a cooperative, shared fashion.

BACKGROUND

In recent years, the world has become increasingly reliant on the sharing of experiences and activities while physically separated by interacting "virtually" using a variety of telecommunications strategies and platforms. The use of collaborative design (also known as participatory design) tools, workflow management systems, webinars, computational engines for online gaming, virtual music performances, and shared whiteboards are examples of activities where two or more individuals may wish to contribute content and/or perform controlling actions in real time during shared, online experiences.

The systems and methods disclosed herein make use of recent advances in the fields of touch-screen displays, mobile devices, camera-based object tracking, inertial measurement units (sometimes also referred to as inertial motion units), and portable device controllers. Collective control may be implemented by combining an ability to specify one or more locations on a touch-sensitive display by one device user, with machine-based abilities to monitor a handheld controller simultaneously manipulated by a second user using camera-based tracking of controller location and/or one or more embedded internal measurement units (IMUs).

The display components of touch-screen displays are typically implemented as: 1) a two-dimensional array of light sources (most frequently light-emitting diodes, LEDs), or 2) two plates of polarized glass that sandwich liquid crystal material (i.e., forming a liquid crystal display, LCD) that responds to an electric current by allowing different wavelengths of light to pass. Within both implementations, such two-dimensional visual displays are composed of (typically millions of) tiny, addressable dots or pixels.

Touch-screen displays use a variety of techniques to sense positions on a screen touched by one or more digits of a hand, knuckles, styluses, or other body parts or pointing devices. Most portable touch-screens operate by sensing: 1) capacitance, 2) resistance, or 3) perturbations in surface (acoustic or ultrasound) waves when touched. The process of touching a screen locally discharges capacitance, completes a resistive circuit pathway or absorbs a surface acoustic wave, allowing the position of one or more digits (or other pointing objects) to be determined.

Although somewhat dependent on the size of a pointer (e.g., finger) and screen position (i.e., with increased accuracy generally occurring near the center of most screens), by computing geometric point references such as the centroid of a touched area, the two-dimensional accuracy of touch-screen displays is generally sufficient to, for example, allow typing using typical keyboard layouts. In addition, the location being pointed to on a touch-sensitive display may generally be computed in absolute terms (e.g., measured in pixels with known spacing, or units of distance) relative to objects displayed on the screen and/or references locations of the display (e.g., display edges, screen center).

Video tracking, involving the use of one or more cameras to continuously locate (and optionally identify) moving objects over time, has benefited from recent developments in machine vision techniques including the use of kernel-based localization and neural networks (especially convolution neural networks, CNNs). These approaches have facilitated a great expansion in the use of video tracking for applications ranging from the tracking of vehicle movements throughout expansive metropolitan areas to the tracking of minute movements of an individual's pupils.

Similar to determining touch screen position as just described, the accuracy of determining the relative location of an object within a visual field may be increased by computing geometric point references such as an object's centroid, or one or more sharp edges or high-contrast regions within its shape. Optimally, objects being tracked are distinctive from other objects and/or backgrounds within a camera's field-of-view. Additionally, when use-environments are not controlled during tracking, hardware- and software-based techniques may be applied to combat image interference produced by a range of conditions including low light, bright sources of light, and high-contrast or complex-patterned backgrounds.

Inertial measurement units (IMUs) may incorporate any or all combinations of: 1) linear accelerometers measuring forces due to movement in up to three axes or dimensions, 2) gyroscope-based sensing of rotational rates or velocities in up to three axes, 3) magnetometers measuring magnetic field (i.e., magnetic dipole moment) including fields generated by the earth, and/or 4) the gravitational pull of the earth (including gravitational orientation) by measuring forces on an internal mass. The accuracy of IMUs varies widely, depending on size, operating range, compensating hardware that may be used for correction of measurements (affecting cost), environmental factors including thermal gradients, the availability of individual device calibrations, and (integration) time required to perform measurements.

Systems and methods that facilitate intuitive collective interactions with electronic devices by two or more users would be useful.

SUMMARY

In view of the foregoing, systems and methods are provided herein for shared or collective control of the display attributes of one or more virtual objects. As described herein, by substantially simultaneously combining: 1) the ease and spatial accuracy of one or more screen touches relative to virtual objects displayed on a touch-sensitive screen enacted by one device user with 2) camera- and/or IMU-based tracking of free-range movements of a second user gripping a handheld controller, intuitive and/or rapid control of one or more virtual objects may be implemented.

In one example, substantially simultaneous shared control may be implemented by combining an ability to specify one or more locations on a touch-sensitive display using one or more digits (or other pointing mechanism such as a stylus controlled by a hand) of one user with an ability to monitor a portable, handheld controller manipulated by a second user. The handheld controller may be tracked by camera-based following of the controller (or, more specifically, camera-trackable controller components) and/or one or more embedded internal measurement units (IMUs). Optionally, one or more switches or sensors may also be included within the handheld controller, operable by the second user.

Examples of display attributes include a virtual object's size, shape, display location, locations of one or more object components (relative to other object components), one or more colors, one or more textures, component line thicknesses, component line characteristics (e.g., solid line, intermittent line, rounded edges), transparency, orientation relative to display edges or other virtual objects, stretch in one or more directions, three-dimensional viewing perspective, rotation, translation, and/or movement characteristics. Virtual object movement characteristics may include one or more ranges of motion, velocity of movement (e.g., scale factors relating controller movements to virtual object movements appearing on a display), implementation of repetitive (e.g., rotational, translational) movements, movements of object components, and so on. Display attributes may also include an initial or updated selection of the displayed virtual object itself (e.g., from a menu of different objects), associated text labelling, flashing and/or other means of attracting attention, the production of one or more sounds associated with the object, and so on.

Camera-based tracking of a handheld controller may be implemented using a tablet, smart phone, laptop, smart television or display, augmented or virtual reality wearable headset, or other mobile electronic device. Such devices often include one or more embedded cameras along with one or more processors and a touch-sensitive display (or "touchable" virtual display in the case of virtual reality headsets). Control functions performed via hand movements may typically be implemented by a system that includes such a device coupled with an operatively coupled, trackable handheld controller with an incorporated IMU. Alternatively or in addition, camera-based tracking of the handheld controller may be implemented using one or more cameras operatively coupled (e.g., via cable or Wi-Fi) to the one or more processors that generate graphics (i.e., not necessarily incorporated within a display device). Alternatively, the handheld controller may (minimally) be a passive (i.e., non-electronic) device, simply composed of camera-trackable device components (e.g., made from polymer or plastic) and/or controls enacted by camera-trackable movements of hand digits.

The use of one or more cameras provides an accurate and rapid (i.e., dependent on camera frame rate and/or processing) method to track relative positions of a handheld controller. However, under some conditions, it may not be possible to continuously follow locations of the handheld controller using such computer vision techniques. This may arise, for example, if the controller is outside the field-of-view of the one or more cameras, concealed by one or more objects between camera(s) and the controller, or obscured by one or more bright lights in the region. During these times, it may be possible to continue estimating movements of the handheld controller using one or more embedded (i.e., affixed anywhere within or on the controller) IMUs. Although integration (i.e., over time) of IMU-based velocity and/or acceleration measures may produce estimates of controller locations, IMUs generally lack abilities to produce precise measures of absolute position, especially over prolonged periods absent absolute measures (e.g., absent tracking using a camera). During times when video-based tracking is not available or viable, IMU-based measurements may help estimate handheld controller locations and/or movements.

In accordance with an example, a method is provided for a human to collectively interact with one or more virtual objects that includes providing in proximity to a first human, a touch-sensitive first display operated by the first human; providing in proximity to a second human, a second display, a camera and a handheld controller, wherein the handheld controller is operated by the second human and includes one or more camera-trackable components, and wherein the first display, the second display, the camera and the handheld controller are each operatively coupled to one or more processors; acquiring, by the touch-sensitive first display, one or more touch locations generated by the first human; assigning, by the one or more processors, one or more first display attributes of one or more virtual objects based on the one or more touch locations; acquiring, by the camera, a first image of the one or more camera-trackable components; determining within the first image, by the one or more processors, a first location of the one or more camera-trackable components; assigning, by the one or more processors, one or more second display attributes of the one or more virtual objects based on the first location; and displaying the one or more virtual objects on at least one of the touch-sensitive first display and the second display, using at least one of the first display attributes and at least one of the second display attributes.

In accordance with another example, a method is provided for a human to collectively interact with one or more virtual objects that includes providing in proximity to a first human, a touch-sensitive first display operated by the first human; providing in proximity to a second human, a second display and a handheld controller, wherein the handheld controller is operated by the second human and includes one or more inertial measurement units, and wherein the touch-sensitive first display, the second display and the handheld controller are each operatively coupled to one or more processors; acquiring, by the touch-sensitive first display, one or more touch locations generated by the first human; assigning, by the one or more processors, one or more first display attributes of one or more virtual objects based on the one or more touch locations; acquiring, by the one or more processors from the one or more inertial measurement units, first acceleration data; determining from the first acceleration data, by the one or more processors, one or both of a first acceleration magnitude and a first acceleration direction; assigning, by the one or more processors, one or more second display attributes of the one or more virtual objects based on one or both of the first acceleration magnitude and the first acceleration direction; and displaying the one or more virtual objects on at least one of the touch-sensitive first display and the second display, using at least one of the first display attributes and at least one of the second display attributes.

In accordance with yet another example, a system is provided for a human to collectively interact with one or more virtual objects that includes a touch-sensitive first display operable by a first human; a second display viewable by a second human; a camera configured to be positioned in proximity to the second human; and a handheld controller configured to be operated by the second human, wherein the handheld controller includes one or more camera-trackable components; and wherein the touch-sensitive first display, the second display, the camera and the handheld controller are each operatively coupled to one or more processors, the one or more processors configured to: determine one or more touch locations on the touch-sensitive first display contacted by the first human; assign one or more first display attributes of one or more virtual objects based on the one or more touch locations; acquire by the camera, a first image of the one or more camera-trackable components; determine within the first image, a first location of the one or more camera-trackable components; assign one or more second display attributes of the one or more virtual objects based on the first location; and displaying the one or more virtual objects on at least one of the touch-sensitive first display and the second display, using at least one of the first display attributes and at least one of the second display attributes.

Other aspects and features including the need for and use of the present invention will become apparent from consideration of the following description taken in conjunction with the accompanying drawings.

BRIEF DESCRIPTION OF THE DRAWINGS

A more complete understanding may be derived by referring to the Detailed Description when considered in connection with the following illustrative figures. In the figures, like-reference numbers refer to like-elements or acts throughout the figures. Presented examples are illustrated in the accompanying drawings, in which.

DETAILED DESCRIPTION

Figure 1A:
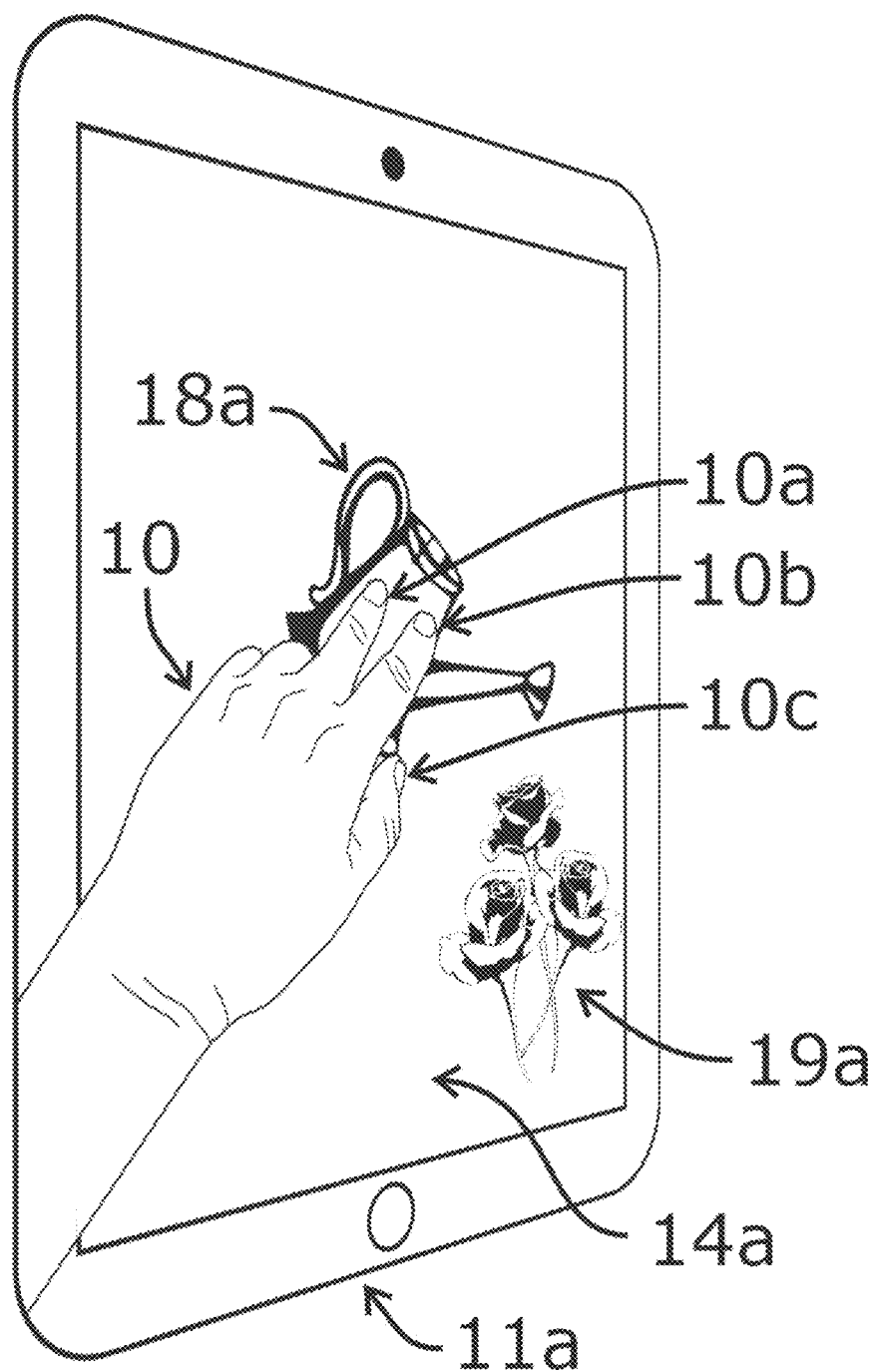
FIG. 1A illustrates one portion of a scenario showing collective control of a virtual watering can being used to water virtual plants in which the touch locations of three digits of a hand of one device user control the can's overall location and size.

Before the examples are described, it is to be understood that the invention is not limited to particular examples described herein, as such may, of course, vary. It is also to be understood that the terminology used herein is for the purpose of describing particular examples only, and is not intended to be limiting, since the scope of the present invention will be limited only by the appended claims.

Unless defined otherwise, all technical and scientific terms used herein have the same meaning as commonly understood by one of ordinary skill in the art. It must be noted that as used herein and in the appended claims, the singular forms "a," "an," and "the" include plural referents unless the context clearly dictates otherwise. Thus, for example, reference to "a compound" includes a plurality of such compounds and reference to "the polymer" includes reference to one or more polymers and equivalents thereof known to those skilled in the art, and so forth.

Also within descriptions herein, the term "substantially simultaneously" is used to describe the performing of actions including interactions involving distinct movements by each individual and subsequent machine-based processing. "Substantially simultaneously" signifies that, although individuals as well as systems and methods may strive to perform such actions collectively or as a part of an interactive sequence, resultant interactions including the "substantially simultaneously" display of one or more virtual objects on electronic display devices that may be separated by a significant distance, may not occur precisely simultaneously. Such temporal differences may arise as a result of a number of factors including integration times required to acquire signals from the touch-sensitive display and/or IMU(s), time required for movement of the handheld controller, camera image capture times, any transmission of resultant data among devices, processing times by one or more operatively coupled processors, differing times required to exhibit results on different display devices, and so on.

Collective control of one or more virtual objects may be implemented by combining an ability to specify locations on a touch-sensitive display using one or more digits (or employing one or more pointing instruments, such as a stylus) of either hand of one user with substantially simultaneously determining the location, movement and/or orientation of a handheld controller manipulated by either hand of a second user. The handheld controller may be tracked by camera-based following of one or more camera-trackable controller components and/or one or more embedded internal measurement units (IMUs). Optionally, to enhance interaction capabilities, one or more switches and/or sensor-based controls may be included within the handheld controller, operable by one or more digits (or other structures) of a hand manipulating the controller and/or one or more digits of an opposing hand.

Alternatively, the handheld controller may (minimally) be a passive (i.e., non-electronic) device, simply composed of camera-trackable components. Controllers may, for example, be constructed from rubber, polymer, wood and/or plastic with distinctly colored and/or shaped features. A controller may even consist of a printed or projected image on a surface (e.g., paper, cardboard). Such minimal control function may, for example, be suitable for brief interactions when an electronic device is not available, and/or within controlled environments where it anticipated that camera-based tracking is routinely reliable (i.e., environments in which IMU-based tracking is rarely, if ever, needed).

Within additional examples, minimal or "dumb" controllers may (optionally) be constructed to have roughly the same colors and shapes as a "smart" (i.e., electronic) controller. Dumb controllers may be particularly suitable for use by very young children where product safety may be of paramount concern. Dumb controllers may provide a subset of control functions (e.g., those implemented exclusively via camera tracking) but be constructed in a manner that avoids breakage or harm (e.g., even when chewed upon). Translational and/or rotational movements of a dumb controller may be tracked by the one or more cameras. Positions of digits or other regions of a hand over specific aspects of the dumb controller (e.g., protrusions that looks like a pushbutton, colored dots), may additionally be used to signal user choices in much the same way as real buttons.

Additional aspects may be incorporated within designs of the handheld controller to include controller elements that make camera-based tracking: 1) reliable, 2) informational, 3) precise, 4) unobtrusive and/or 5) rapid. Reliability, including the ability to distinguish the controller from elements within a typical user environment (i.e., under a variety of background and/or lighting conditions), may be enhanced by including one or more unique visual elements of the controller that are not normally observed within user environments. The one or more camera-trackable components may include one or more incorporated light emitting diodes, one or more light-reflective surfaces, one or more colored surfaces, one or more translucent materials, one or more light-diffusing materials, a predetermined component shape, a predetermined light-reflective pattern, a predetermined colored pattern, a predetermined translucent material pattern, and/or a predetermined light-diffusing pattern.

Such distinguishing elements may also be sized and/or spaced at known (i.e., to the one or more processors) distances or dimensions. By comparing size/spacing within camera images of elements with known dimensions/spacing (and knowing point spread functions of the optical arrangement of the one or more cameras), estimates of distance between the one or more cameras and the handheld controller may be obtained. Alternatively, or in addition, tracking by two or more cameras (i.e., from different viewing angles) may allow distances (from cameras and/or other objects in the environment) to be "triangulated". Additionally, by making different elements of the camera-trackable components of the controller distinguishable (e.g., using different colors, reflective surfaces and/or shapes), rotational orientation (i.e., in one or more axes) of the controller (e.g., relative to the portion of the controller held by a hand, see FIG. 1C) may be discerned.

Such sizing and or spacing may also be optimized to coincide with camera resolution(s) (i.e., covering a sufficient number of pixels within camera images) to maximize tracking resolution over the range of viewing distances (i.e., from camera to handheld controller) anticipated during normal use. By utilizing sufficient camera resolution, camera-based tracking elements of the handheld controller may also allow sizing and/or separations of the camera-trackable elements of the handheld controller to be unobtrusive (e.g., in weight, separation and/or size) during use (see FIG. 1C). In other words, by having camera resolution be sufficient to allow images of camera-trackable controller elements occupy an adequate number of light-sensing pixels (i.e., contributing to the precision of calculations) to make accurate positional calculations during tracking at normal operating distances, the camera-trackable elements may be made small enough so as to not interfere with manually manipulating the controller.

As illustrated in flowcharts within FIGS. 2, 3 and 4 and described further below, shared control may be implemented by repeatedly (i.e., using a loop structure) querying whether a touch-sensitive screen has been touched by one user, assessing handheld controller movements via image processing and/or IMU measurements and, optionally, sensing the states of any controller switches or other sensors manipulated by a second user. Although implementations are not restricted to such serial loop structures, an overall range for shared control update rates may be estimated by individually considering each data stream:

1) Frequently, rates for sampling a touch screen are in the same range as display rates, often 30 (thirty) to 120 (one hundred twenty) Hertz.

2) IMU-based measurements generally include a trade-off between noise and sample rate, but many IMUs may operate in ranges up to 400 (four hundred) samples per second while keeping costs (e.g., for compensation circuitry) and/or power consumption modest.

3) When tracked by one or more cameras and as long as sufficient computing resources are available, the temporal resolution of control by imaging the handheld controller generally aligns with the frame rate of the camera(s).

In further examples, modern-day cameras allow frame rates to be controlled dynamically. Thus, in situations when rapid responses are not required and/or anticipated, frame rates may be kept relatively slow (e.g., one to fifteen frames per second) in order to conserve computing resources and/or power consumption. In situations when rapid responses are advantageous (e.g., detailed drawing, accurately discerning rapid movements such as throwing a virtual ball) frame rates may be increased (e.g., thirty to two hundred frames per second and beyond) in order to accurately record small movements and/or large velocities of tracked objects. Along similar lines, IMU sampling rates may be increased (often at the cost of increased noise) during times when measurements of smaller movements and/or larger velocities are anticipated.

Using one or more digits to point at locations on a touch-sensitive display screen offers an ability to specify locations in absolute terms (i.e., measured in terms of absolute distance and/or pixels with known spacing) relative to displayed objects or other references such as edges of the display, buttons on the display, and so on. In contrast, measured (i.e., by a camera and/or IMU) movements of the handheld controller are generally not aligned with absolute dimensions on a display screen or any internal representation of distances within a collection of one or more virtual objects.

Within many situations during human-machine interactions, precise indications of absolute position and/or location relative to one or more virtual objects on a display may not be required. As a simple example, upon viewing and selection of a fork in a virtual road, an indication of whether to turn left or right (i.e., a simple binary choice) may be indicated with limited spatial precision. In this case, any indicated location or motion in a direction to the left or right (e.g., absent any requirement to point directly at a right or left pathway) would be sufficient to indicate a user's choice.

In further examples, the use of locations and/or motions by a controller that take into account interactive context leads to a notion of "interpretive control". Interpretive control may reduce the accuracy, sample rates, and/or number of degrees of freedom required of controlling devices by making assumptions about user intent based on interactive context. Examples of contextual interpretations that may lead to a relaxing of controller precision include specifying a choice from a limited number of viable selections, using one or more previous and/or frequent selections to arrange choices within spatial patterns that make similar selections easy to pick, linear or other forms of extrapolation of shapes and/or motions of virtual objects, motions or other characteristics of virtual objects constrained by known laws of physics (e.g., deformations, flow, reactions to gravitational pull), and so on.

Thus, "interpretive control" may relax constraints on location(s) and/or motion(s) of virtual objects specified by one or more controllers based on context. For example, if a selection is being made among a number of virtual objects, then the spatial resolution to make a selection may be reduced to the point of simply distinguishing one selection from another (e.g., only being in the vicinity of a virtual object, not having to directly specify a location directly occupied by a particular virtual object). Along similar lines, if an activity involves movement in a limited number of dimensions (e.g., movement in one linear or angular direction) then controlling motions in other directions may be ignored. If an activity involves movement over a confined range (in one or more directions), then controller indications of movements beyond that range may be ignored. In further examples, if a controller location and/or movement is sufficient to specify a particular virtual activity, then the entire activity may be completed (i.e., by the one or more processors), regardless of additional inputs by the controller (until the action or activity is completed). Interpretive control may be particularly useful within interactions involving the very young, the elderly, or those with reduced motor and/or cognitive functions.

Although interpretive control may be applied using any interactive device, interpretive control using the handheld controller may be particularly beneficial during individual and/or shared interactions. As just described, lacking an ability by the handheld controller to directly specify absolute positions on a display (i.e., without some form of visual feedback) may be limiting in some applications. However, using interpretive control and/or context to relax constraints (e.g., not requiring absolute position) expands the utility of handheld controllers.

Figure 5A:
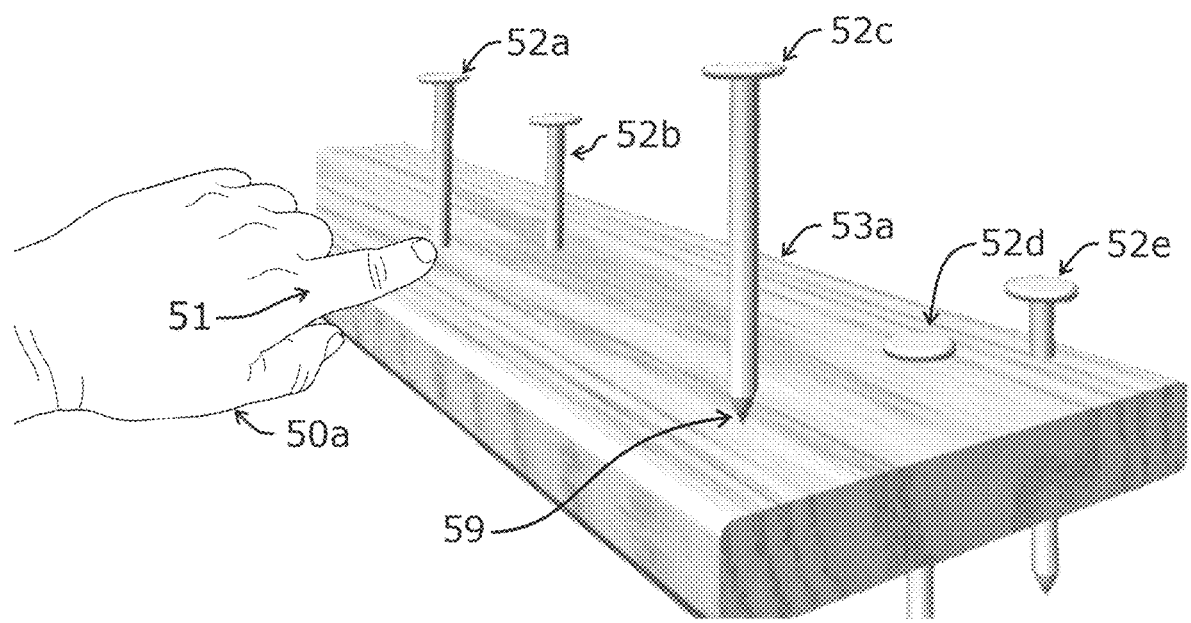
FIG. 5A shows one portion of a scenario involving the hammering of virtual nails to fasten virtual boards during a construction project in which one user positions each virtual nail to be hammered using a touch-sensitive display.
Figure 5B:
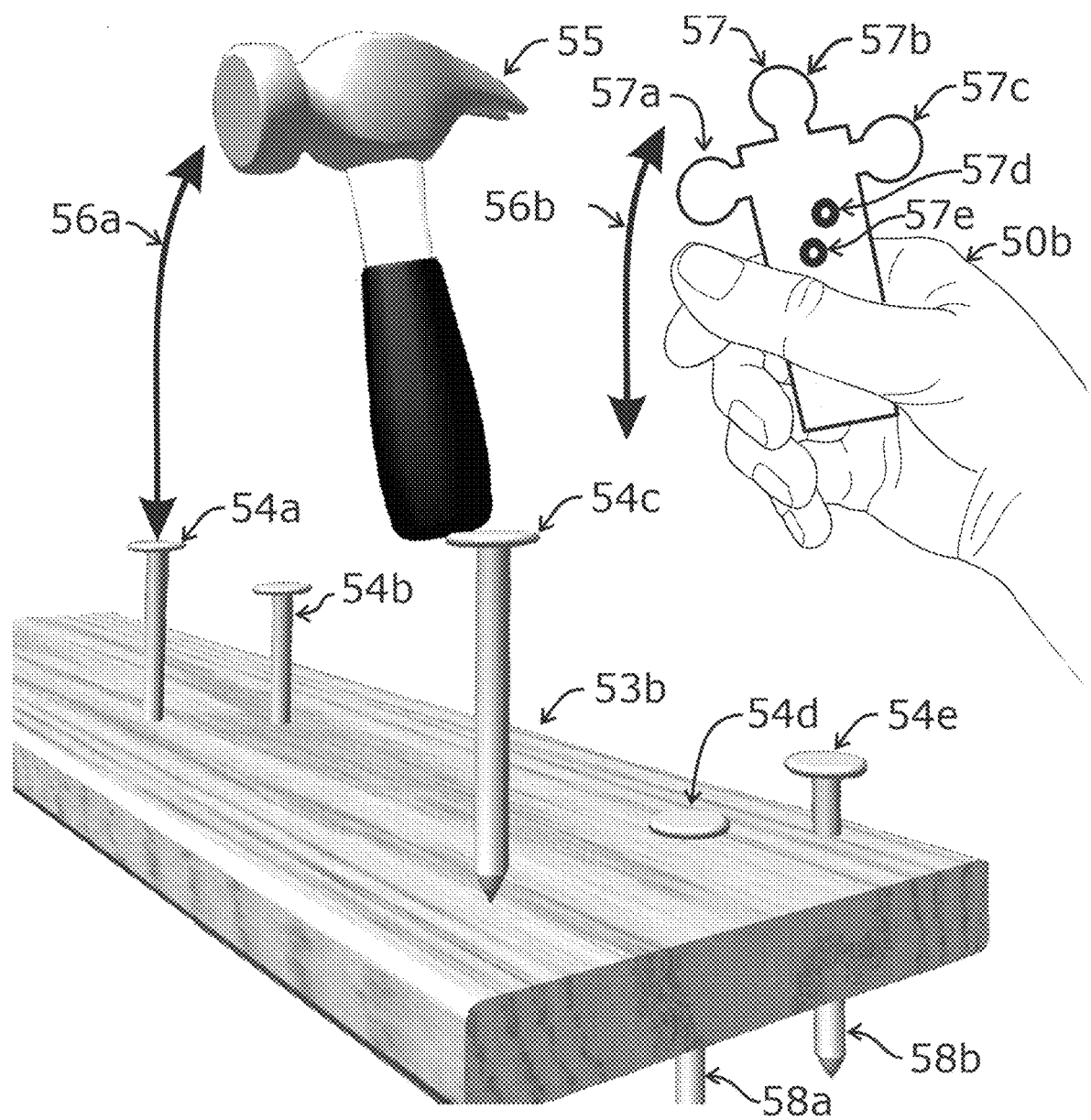
FIG. 5B continues the scenario illustrated in FIG. 5A where a second user hammers specified nails using a handheld controller to operate a virtual hammer.

As examples, the act of hammering a nail illustrated in FIG. 5B may interpret any generally up-and-down motion by the handheld controller (or up-and-down swipes on the touch-sensitive display) as generating virtual hammering. Once a virtual nail has been specified (e.g., using the touch-sensitive screen, see FIG. 5A), exact positioning of the hammer above a nail (e.g., otherwise causing a nail to be "missed") may be excluded as a requirement during interpretive control. Similarly, back-and-forth or rotational motions by the controller (or sideways swipes on the touch-sensitive display) are not considered within "hammering" actions. Interpretive control of the process of hammering as illustrated in FIG. 5B may be particularly helpful to a young child who might not yet possess motor controls for precise movements or understand all of the nuances involved with the process of hammering a nail, or to and individual with limited motor skills.

Figure 6A:
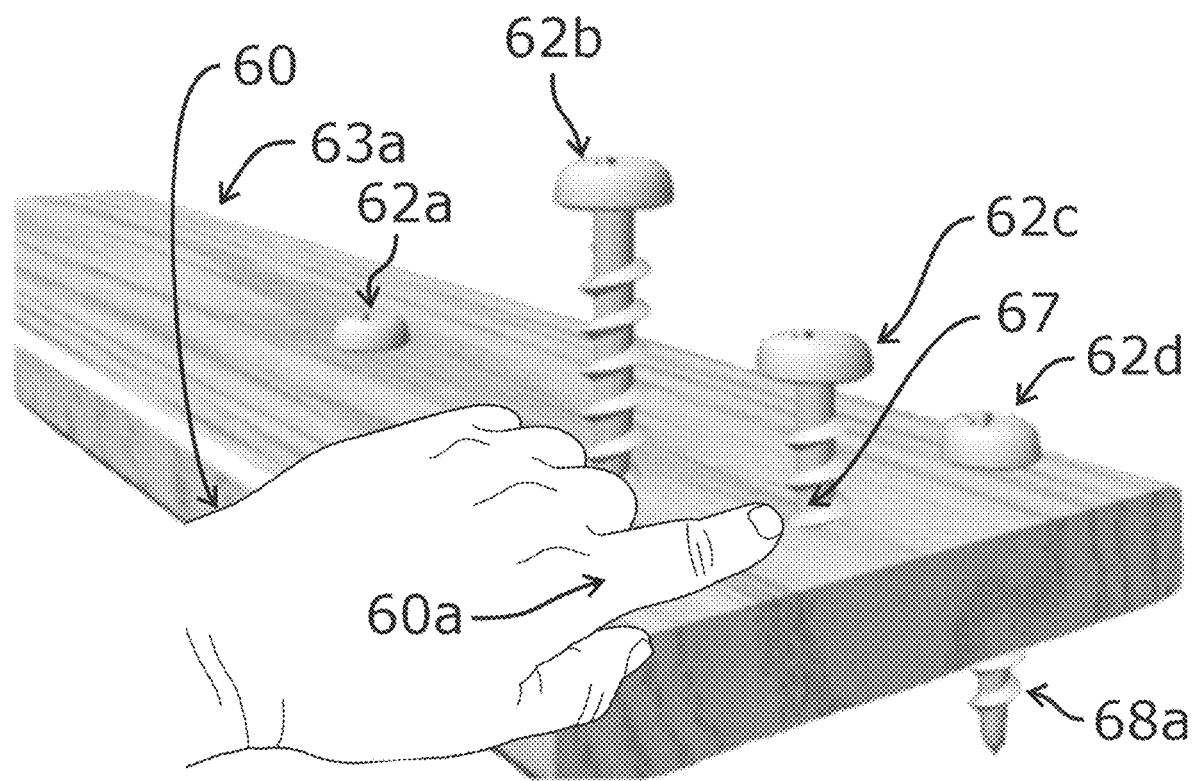
FIG. 6A shows one portion of a scenario involving the use of virtual screws to fasten virtual boards in which one user controls the location of each screw using a touch-sensitive display.
Figure 6B:
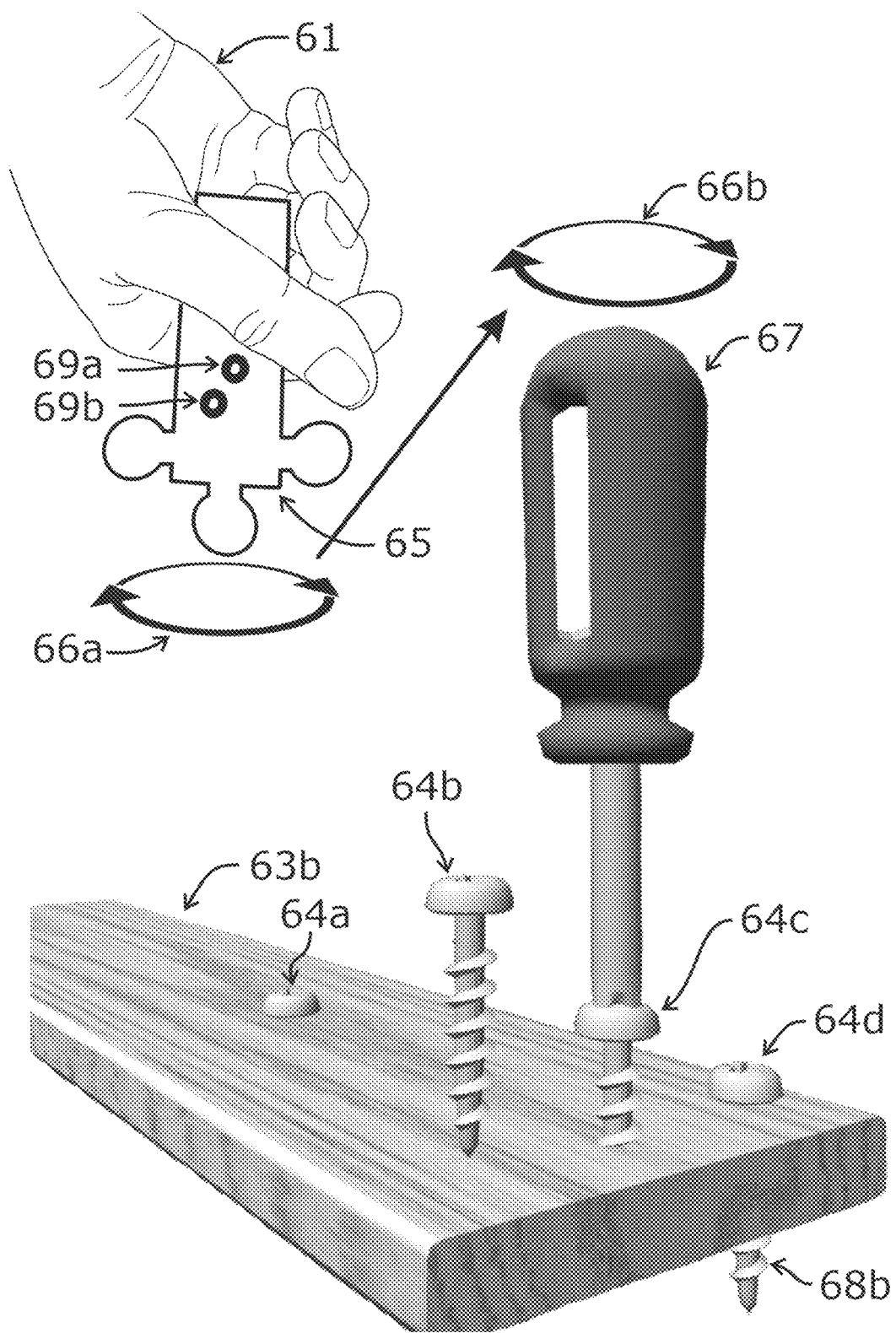
FIG. 6B continues the scenario shown in FIG. 6A where a second user manipulates a handheld controller to direct the rotational operation of a virtual screwdriver in order to insert each screw.

Along similar lines and as illustrated in FIG. 6B, any rotational motion by the controller may be interpreted as turning a screwdriver. Interpretive control removes commonly applied one-to-one mapping (e.g., of a typical cursor) relating controller movements with absolute position on a display. Rather, screen touches and handheld controller movements in particular may be interpreted for intent, based on context, and applied to virtual activities.

Within additional examples, attributes associated with the display location of a virtual object may contextually take into account a virtual object's size, shape, rotational orientation, primary features, and/or even one or more nearby virtual objects. If a virtual object reference (e.g., center, edge, directional pointing feature) or identifiable subcomponent (e.g., face, arm, handle, button, lever) is in the vicinity of a location indicated via collective interaction, display of the virtual object may be offset, sized or oriented to take into account key object features. Locations may be "nudged" (i.e., over small distances) to align with a virtual object's and/or adjacent objects' features or references. In other words, mapping of handheld controller locations or motions may not be applied strictly in a one-to-one fashion when determining an object's display location, rotational orientation or other attributes.

More specifically, by manipulating a touch-sensitive display screen and/or handheld controller, a virtual object display location may be determined by one of:

1) aligning one or more touch locations with one of a center of the virtual object, a predetermined edge of the virtual object, a predetermined reference location of the virtual object, the predetermined reference location of the virtual object offset by a predetermined distance and a predetermined direction, and a rotational center of the virtual object;

2) identifying a nearby displayed object located closest to the one or more touch locations, identifying a predetermined nearby reference location of the nearby displayed object, and displaying the virtual object at the predetermined nearby reference location;

3) aligning controller location with one of a center of the virtual object, a predetermined edge of the virtual object, a predetermined reference location of the virtual object, the predetermined reference location of the virtual object offset by a predetermined distance and a predetermined direction, and a rotational center of the virtual object; and 4) identifying a nearby displayed object located closest to the controller location, identifying a predetermined nearby reference location of the nearby displayed object, and displaying the virtual object at the predetermined nearby reference location.

Selections made during shared control (i.e., by more than one user) may also be subject to interpretive control. Controller-specified locations and/or motions during selections may consider context(s) established by either or both (or additional) users. For example, if one interactive user asks a second individual select a favorite pet, selections may be restricted to regions of a display and/or motions that represent animals. Based on context within a displayed scene, a non-animal virtual object may be ignored and/or a nearby animal may be selected during the interpretive interaction.

Optionally, handheld controllers may include one or more pushbuttons or other sensors to determine the position and/or force applied by one or more digits of the hand manipulating the controller or the opposing hand. Such "digital" (i.e., signalling generated by digits of the hand) sensing mechanisms may include galvanic contact, capacitive (e.g., discharge caused by a digit), reflective light (i.e., reflecting off the skin of a digit), force (e.g., force-sensing resistors), and so on. Selections determined from the position, movements (i.e., relative to the controller itself) and/or forces applied by the digits (or other structures) of a hand may complement control enacted by overall tracked movements of a controller.

As an example of complementary "digital" control, while movements of a controller direct the viewing perspective (e.g., direction, distance) of a displayed object, the pressing of a pushbutton may enact an ability to select (e.g., from a menu) different virtual objects. As a more specific example: 1) the size and location on a display of an object such as an automobile may be specified using one or more digits of one hand of a first user contacting the touch-sensitive display, 2) the viewing perspective of the display including observational direction and/or distance may be controlled by the position in space (i.e., relative to the camera) of a handheld controller manipulated by a second user, and 3) one or more pushbuttons on the handheld controller (i.e., manipulated by the second user) may either switch among a pre-selected sequence of models of automobiles (e.g., by a sales person) and/or enable scrollable menus to select from an array of different manufacturers and/or models.

Other examples of "digital" indications coupled to handheld controller movements within collective control settings include selection of font and/or sizing when positioning text, selecting a pre-specified/alternative set of object attributes (e.g., line thickness or fill pattern), selecting alternative object colors, enabling a display of object attribute menus, temporarily increasing or decreasing the magnification applied while displaying an object, "undoing" a previous selection and/or attribute, repeating the application of one or more attributes, copying a selected virtual object, erasing a virtual object, and so on.

Additional examples of collective interactions involve controlling a viewing perspective (e.g., viewing location and direction) of an individual within an environment of virtual objects. Such virtual objects may include interactive tools, rooms, dwellings, landscape, avatars and/or even streaming video representations of other interactive users (e.g., full body, head, or head-and-shoulder images) superimposed within a "virtual world". One user may specify an object or a viewing location within a virtual world using a touch-sensitive display (i.e., by pointing). Substantially simultaneously, a second user may control aspects of viewing perspective (i.e., in which direction to turn and look) using the handheld controller. One or more display devices may project a viewing perspective as if within the virtual world or room (e.g., finding and looking toward selected objects and/or other users). This form of collective control may generate an intuitive combination of controls where one user identifies specific objects and/or scenes that may be of interest to one or more members of a group and a second user controls a closer examination of the selected object or scene.

Selections of which user and/or which hand to interact using the touch-sensitive display versus manipulation of the handheld controller may be based on 1) personal preferences and/or 2) particular applications. Generally, interactions that involve specifying specific locations (particularly relative to displayed elements) are amenable to pointing on the touch-sensitive display and dynamic interactions (e.g., signifying actions, activities or movements) may be implemented intuitively using the handheld controller. However, illustrating the converse, swiping motions may be recorded on touch-sensitive displays and lack of movement of the controller for a predefined period may be used as a signalling indication to perform one or more virtual actions. Thus, human-machine interactions may be set up for either user to contact the touch-sensitive display versus manipulating the handheld controller (or even to interchange roles dynamically) and/or to use any combination of left and right (dominant versus non-dominant) hands contacting the touch-sensitive display and manipulating the handheld controller.

Within additional examples, although not "handheld" in a strict sense, controllers may be affixed and/or manipulated by other parts of the human body. A controller may, for example, be affixed to an arm, leg, foot, or head. Such positioning may be used to address accessibility issues for individuals with restricted upper limb and/or hand movement, individuals absent a hand, and/or during situations where a hand may be required for other activities. Controller movements (e.g., camera-trackable controller components) may be tracked based on motions of the controller generated by other body parts. Even pushbutton switches may be activated based on forces produced by other body parts and/or by pushing the portion of the controller containing the one or more switches against a static object (e.g., rod or other pointed mechanism of an appropriate size to operate pushbuttons).

In further examples, context may also be used to modulate controlling actions (e.g., via a handheld controller and/or touch display) enacted by one or more users. For example, if a handheld controller is used to direct an avatar, cartoon character or virtual animal to walk in a particular direction, then as long as there is sufficient virtual lighting and the virtual path is unobstructed in the selected direction, a brisk walk may be performed. However, if the context of the virtual environment is one of being dark and gloomy, then ambulation made be modulated to include more careful steps with body language consistent with a gloomy demeanor (e.g., sad face, drooped shoulders). Controlling movements of, for example, a handheld controller may be the same under both scenarios; however, context determined within each virtual environment may modulate resultant virtual actions.

Context of a virtual interaction scenario may be determined from one or more pre-assigned or labelled contexts associated (e.g., encoded directly within data files or within separate databases that are pointed to during the generation of content), and/or determined in real time from audiovisual content using tools such as object and scene recognition routines, and/or natural language processing, known in the art. Pre-assigned contexts may include contexts that are not directly observable (e.g., the emotional state of a character), based on events within a serial presentation that occur in the future, and/or based on past experiences or attitudes (e.g., educational level, arachnophobia, etc.) of the one or more content producers and/or users. Determining context from audiovisual content and subsequently generating reactions by a virtual agent based on such contexts are described more fully in application Ser. No. 17/233,473, filed Apr. 17, 2021, the entire disclosure of which is expressly incorporated herein by reference. One exemplary shared environment in which context is an important aspect of virtual interactions is during story-telling. Shared control of page-turning and other aspect of shared control are described more fully in application Ser. No. 63/257,205, filed Oct. 19, 2021, the entire disclosure of which is expressly incorporated herein by reference. A parent or guardian (i.e., first user) may point to a page that is contextually ready to be turned. A child or children (i.e., second user) may then turn the indicated page when ready (e.g., using a handheld controller).

Story-telling in particular allows two or more users to share contexts that are essentially unlimited in scope (e.g., not limited by time or physical principles). Such contexts may be used to direct actions of characters or other virtual objects that are related to the story, helping to augment the story-telling process. For example, virtual objects may be pointed out via a touch-sensitive display by one user and subsequently manipulated (e.g., magnified, viewed from different perspectives, modified) via a handheld controller by a second user. Repeated use of such a framework of collective activities has numerous additional areas of application including education (at all levels), entertainment, sales, collective development of art, and so on.

Figure 1B:
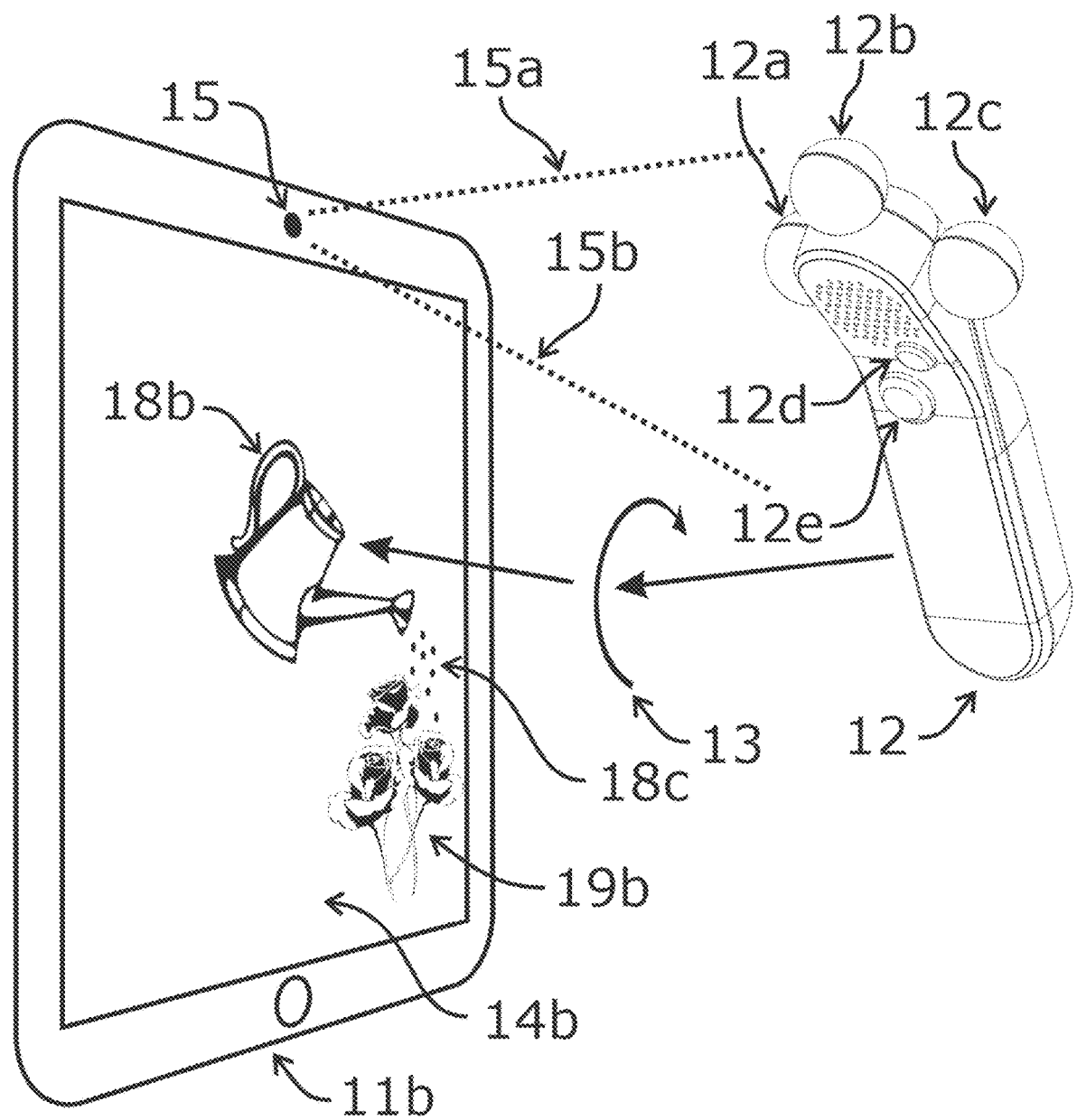
FIG. 1B continues the scenario shown in FIG. 1A in which a handheld controller manipulated by a second user controls the rotational orientation of the watering can that, in turn, controls the flow of virtual water during the virtual plant-watering process.

FIGS. 1A and 1B illustrate elements of collective interactions, demonstrating shared control by two users (not shown) of a virtual watering can (18a in FIG. 1A and 18b in FIG. 1B) to water a bouquet of virtual roses (19a in FIG. 1A and 19b in FIG. 1B) viewed by the two users separately on two display devices (11a in FIG. 1A and 11b in FIG. 1B). The one or more processors within each of the two devices 11a, 11b may be operationally connected via one or more forms of telecommunications links (Wi-Fi, Bluetooth, cellular network, etc.).

FIG. 1A shows a tablet-style electronic device Ila with a touch-sensitive display 14a manipulated by three digits 10a (i.e., middle finger), 10b (i.e., index finger), 10c (i.e., thumb) of the left hand 10 of the first of the two users. In this exemplary case, the first user may manipulate digits 10a, 10b, 10c on the touch-sensitive display 14a to select a watering can Ila (e.g., from a menu of gardening tools, not shown), control its overall size, and position the can to water a particular set of roses 19a (i.e., the first user effectively selecting which plants to be watered).

FIG. 1B demonstrates subsequent pouring of virtual water 18c from the watering can 18b onto the roses 19b by the second user, enacted by tracking the handheld controller 12 and mimicking detected controller rotational movements 13 to rotate the watering can 18b viewed on a display device 14b by the second user. By manipulating the handheld controller 12, the second user effectively regulates timing, flow rates and how much cumulative water to pour onto the virtual plants 19b.

Tracking of one or more camera-trackable components 12a, 12b, 12c of the handheld controller 12 may occur when the handheld controller 12 is within the field-of-view (indicated by dashed lines 15a, 15b) of the camera 15 of the second user's tablet device 11b. In this case, the camera-trackable components of the handheld controller 12 include three spherical structures 12a, 12b, 12c that may include internal, illuminating light sources (e.g., LEDs, not shown). Optionally, each element of the camera trackable components may include distinct visual characteristics (e.g., unique orienting patterns, differing reflecting and/or illuminating colors, distinct shapes) to help track (e.g., distinguish tracking elements from each other and from background) and determine orientation of the handheld controller 12 within camera images (e.g., relative to the handheld portion of the handheld controller 12, see FIG. 1C). For example, the internal light sources (e.g., LEDs) just described within each of the spherical structures 12a, 12b, 12c may differ from each other in color and/or generate distinctive (e.g., modulated or pulse on/off) lighting patterns.

In additional examples, during situations when it is possible that more than one controller (e.g., one or more additional controllers manipulated by a second hand of a user or a third user) may be within the visual field 15a, 15b of a camera 15, one or more distinctive reflective patterns and/or the timing of modulating controller light sources may be used to distinguish one controller from another. During normal operation by a user, modulation of controller lighting may be an aspect of user feedback (e.g., a flashing "reward" indication for keeping virtual plants alive). Knowledge by the one or more processors of the status of distinctive lighting during normal use or brief periods when identifying lighting patterns produced by a controller (e.g., encoding a controller serial number) may be used to periodically identify individual controllers within a visual field.

Alternatively or in addition, during situations in which multiple controllers may be within the visual field 15a, 15b of a camera 15, the identity of each controller may be determined by assessing correlations between camera and IMU-based measurements (where IMU-based data are transmitted from identified devices). Data streams that exhibit a high degree of correlation between controller velocity and/or acceleration (i.e., magnitudes and directions) measured from camera images versus IMU data streams from identified devices may allow intermittent or continuous associations and identification of controllers.

During operation, controllers may (optionally) include additional modes of user feedback including haptic and audio signalling. Based on such signals, a user may be instructed to perform an identifiable action during the time the controller is producing such user feedback. For example, upon sensing haptic vibration or sound from the controller (or other sources of user feedback), the user may wave a controller in the air. The sensing of such controller motion may subsequently be used to verify the identity of a specific controller and/or associated device user.

FIG. 1B also shows a pair of pushbuttons 12d, 12e incorporated within the handheld controller 12. These additional optional controller elements may be depressed by one or more digits of the hand (see 16 in FIG. 1C) used to manipulate controller 12. Depressing individual switches or combinations of switches 12d, 12e may, for example, immediately alter the attributes of virtual objects (e.g., nozzle controlling flow characteristics of the virtual watering can) and/or actions enacted using handheld controller 12.

Figure 1C:
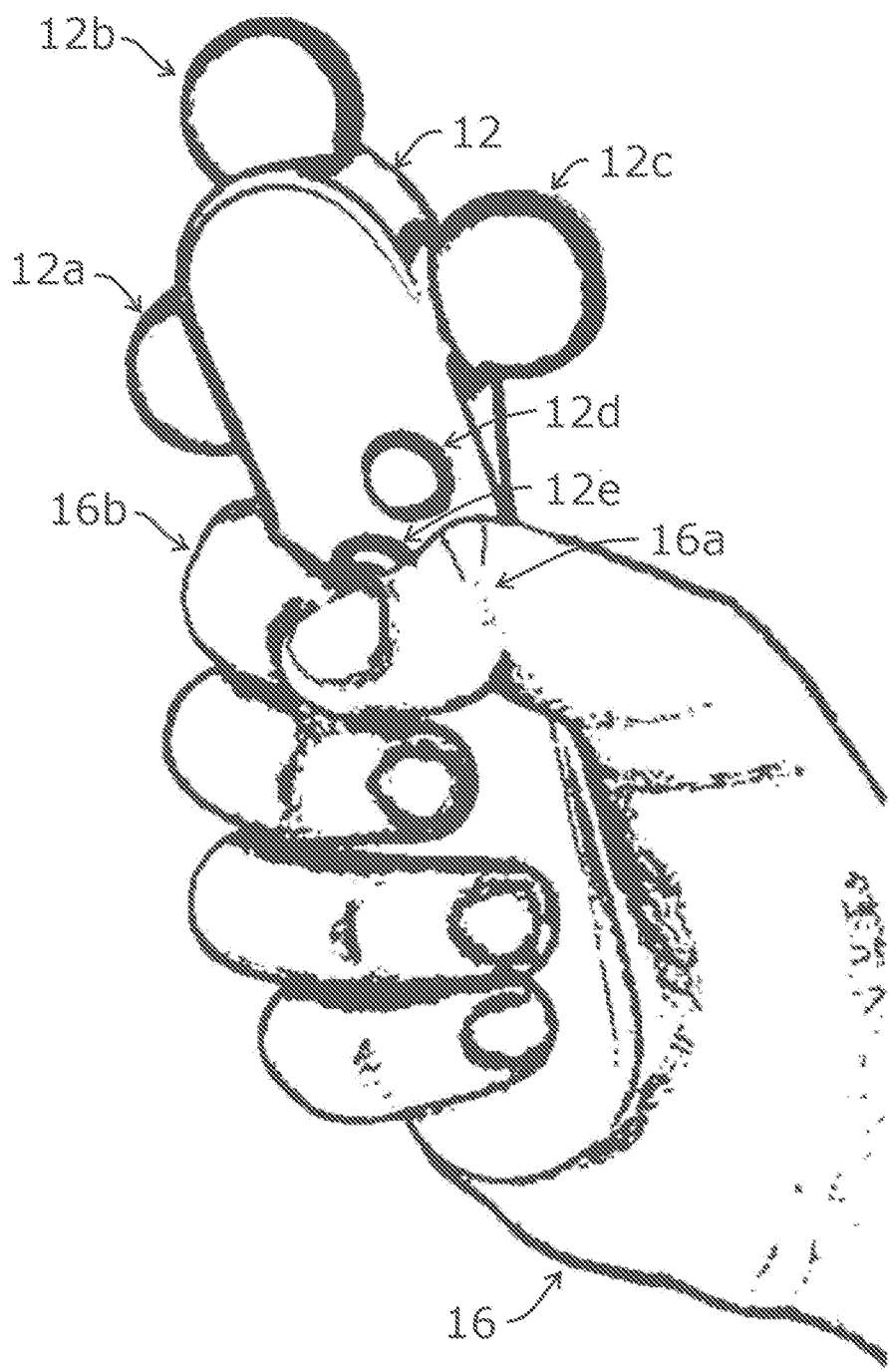
FIG. 1C shows a handheld controller used to enact collective control including three spherical components (i.e., balls) to facilitate camera-based tracking of the controller and two pushbutton controls (where the thumb in FIG. 1C is moved slightly compared with normal controller use to reveal hand-operated switches).

FIG. 1C conveys a more detailed view of the handheld controller 12 illustrated in FIG. 1B along with a view of a child's hand 16 gripping the handheld controller 12. In this image, the thumb 16a of the hand 16 has been moved slightly compared to its position during normal use in order to reveal two switches 12d, 12e that may optionally (i.e., in addition to tracking of the movements of the overall controller) be used as additional handheld controls. As shown in FIG. 1C, both switches 12d, 12e may be operated by a thumb 16a or, alternatively, one switch 18a may be operated by a thumb 16a while the other switch 18b may be operated by an index finger 16b.

FIG. 1C also shows three trackable spherical components (i.e., attached balls) 12a, 12b, 12c that may help enact camera-based tracking of the handheld controller 12. As just described, these balls 12a, 12b, 12c may be translucent or transparent, and/or illuminated from within using different colored LEDs. The size and separations of the spherical structures may be known to the one or more processors, further helping calculations to determine locations and orientations (including estimates of distance from one or more cameras) of the handheld controller 12 based on camera images.

Figure 2:
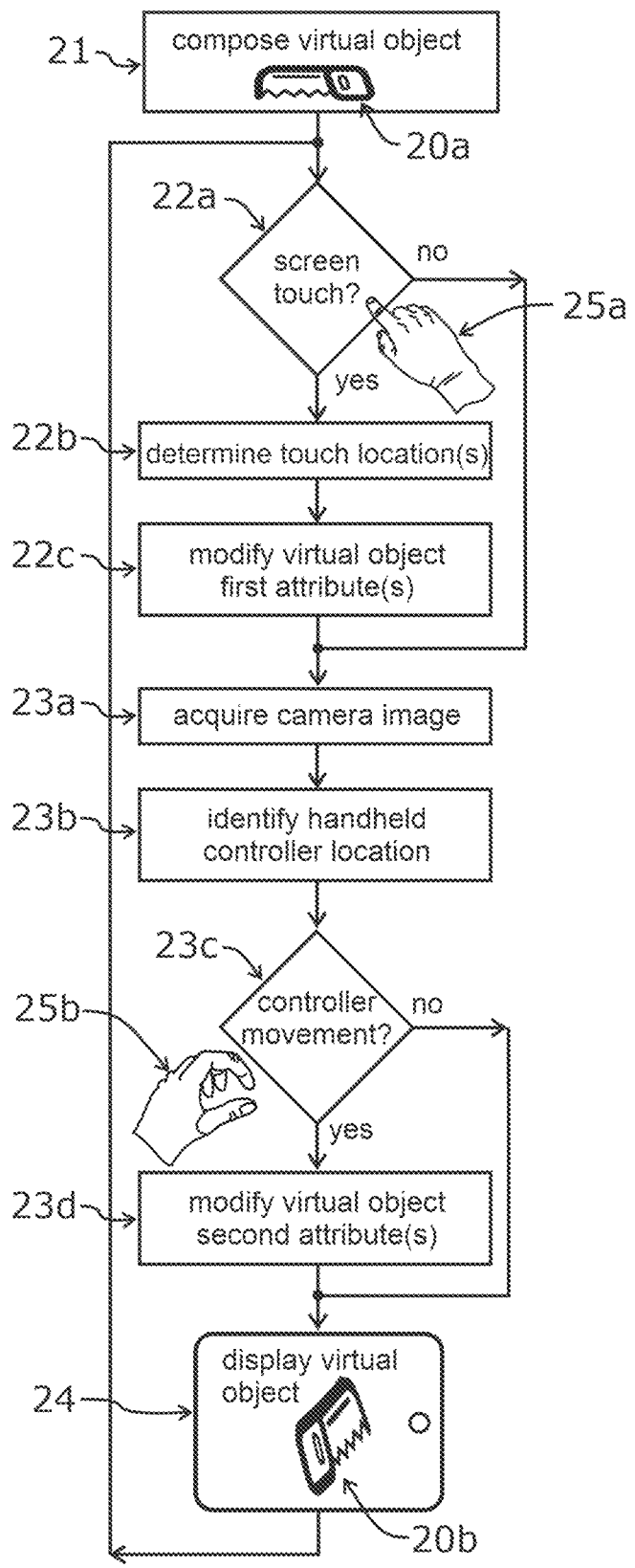
FIG. 2 is a flowchart outlining exemplary steps to acquire collective interactions with a virtual object (i.e., a saw) via a touch-sensitive display operated by one user along with camera-based tracking of a handheld controller manipulated by a second user.

FIG. 2 is a flowchart that outlines exemplary steps to acquire and implement shared interactions with a virtual object via a touch-sensitive display operated by one or more digits of one hand 25a of an individual, and camera-based tracking of a handheld controller manipulated by a hand 25b of another individual. In this exemplary case, the virtual object is a handsaw 20a, 20b. The interactive session begins at 21 by composing, using one or more processors (not shown), a representation of the virtual object (i.e., the saw) 20a. If one or more digits of, in this example, a right hand 25a are sensed as touching the screen at 22a, then the one or more touch locations are determined at 22b and used as controls to modify one or more virtual object attributes at 22c. These attributes might include, for example, the handsaw's screen location and/or rotational orientation.

Next, a camera image is acquired at 23a by the one or more processors. If trackable components of the handheld controller (operated by the left hand 25b of the second individual) are identified with the image at 23b, the newly acquired controller location is compared with any previous location(s) to determine if significant movement has occurred at 23c. If so, then one or more second sets of attributes of the virtual object may be modified at 23d. These attributes might include, for example, a directional perspective to view the virtual handsaw and/or distance from the virtual object of that viewing perspective. Using both the first and second sets of virtual object attributes, an updated representation of the virtual object may be computed and displayed, for example, on one or more tablet devices at 24. In this example, the handsaw is re-drawn with a three-dimensional point-of-view as if it were being viewed during typical use by a left-handed person 20b.

Figure 3:
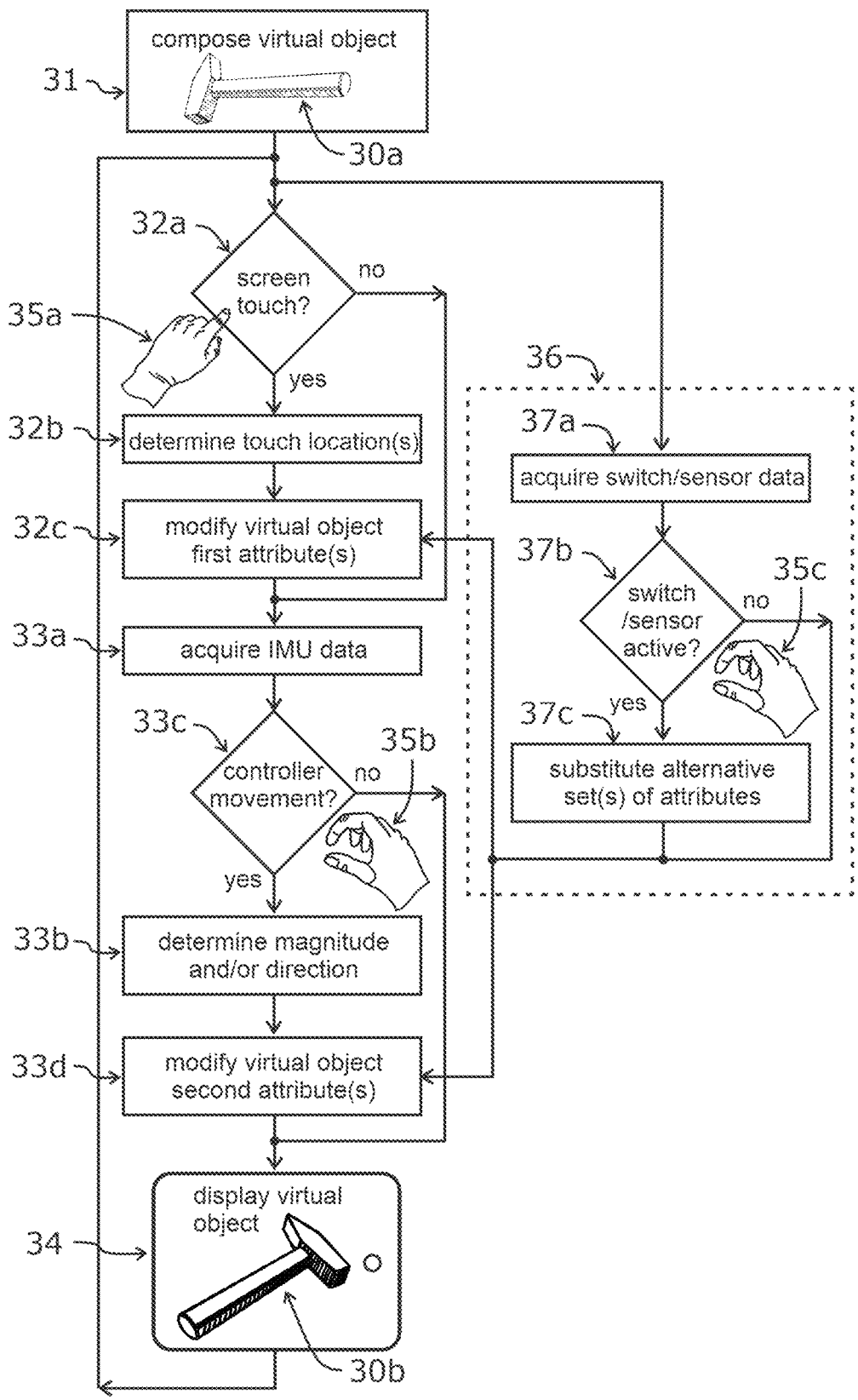
FIG. 3 is a flowchart outlining exemplary steps to acquire collective interactions with a virtual object (i.e., a hammer) via a touch-sensitive display operated by the left hand of one user along with IMU-based tracking of a handheld controller (and optional pushbutton selections) manipulated by a right hand of a second user.

Structured similarly to FIG. 2, FIG. 3 is a flowchart that outlines exemplary steps to acquire and implement shared interactions with virtual objects via a touch-sensitive display operated by one or more digits of a hand 35a of an individual, and IMU-based tracking of a handheld controller manipulated by a hand 35b of a second individual. The interactive session begins at 31 by composing an initial representation of a virtual hammer 30a. If one or more digits of, in this example, a left hand 35a of the first user are sensed as touching the display at 32a, then the one or more touch locations are determined at 32b for use as one or more controls to modify one or more of the virtual object's attributes at 32c. These attributes might include, for example, the virtual hammer's size, color (e.g., to identify or point out the selected object to the one or more other users) and/or rotational orientation.

IMU data are then acquired at 33a by the one or more processors (not shown). If sufficient acceleration of the handheld controller (held by a right hand 35b of the second individual in this example) is measured in one or more directions (i.e., any of three dimensions) at 33c, then magnitudes and movement directions are determined at 33b and used to compute one or more second sets of attributes of the virtual object at 33d. In this exemplary case, these attributes might include screen position of the hammer (e.g., in order to enact a hammering action). Using both the first and second sets of virtual object attributes, the virtual object may be displayed, for example, on any number of tablet devices at 34 viewable by any number of users. In FIG. 3, the hammer has been drawn with thicker component lines (compared with the initially composed object 30a) and rotated such that the head of the hammer 30b points toward the upper right of the display (e.g., directed toward a virtual nail, not shown).

FIG. 3 also illustrates an optional inclusion (indicated by a dashed-line rectangle 36 surrounding optional steps) of substantially simultaneously sensing statuses of one or more pushbutton switches and/or other handheld controller sensors operated by a hand 35c of the second individual. The statuses of the one or more switches/sensors may be acquired at 37a by one or more processors (not shown). If the status of one or more switches/sensors has changed (compared with previous switch status acquisitions), then one or more alternate menus of attributes may be substituted at 37c during the processes of modifying first and/or second sets of virtual object attributes as a result of one or more screen touches at 32c and/or controller movements at 33d resulting from camera-based tracking (not shown in FIG. 3, see FIG. 2) or IMU-based detection of movements of the handheld controller.

Figure 4:
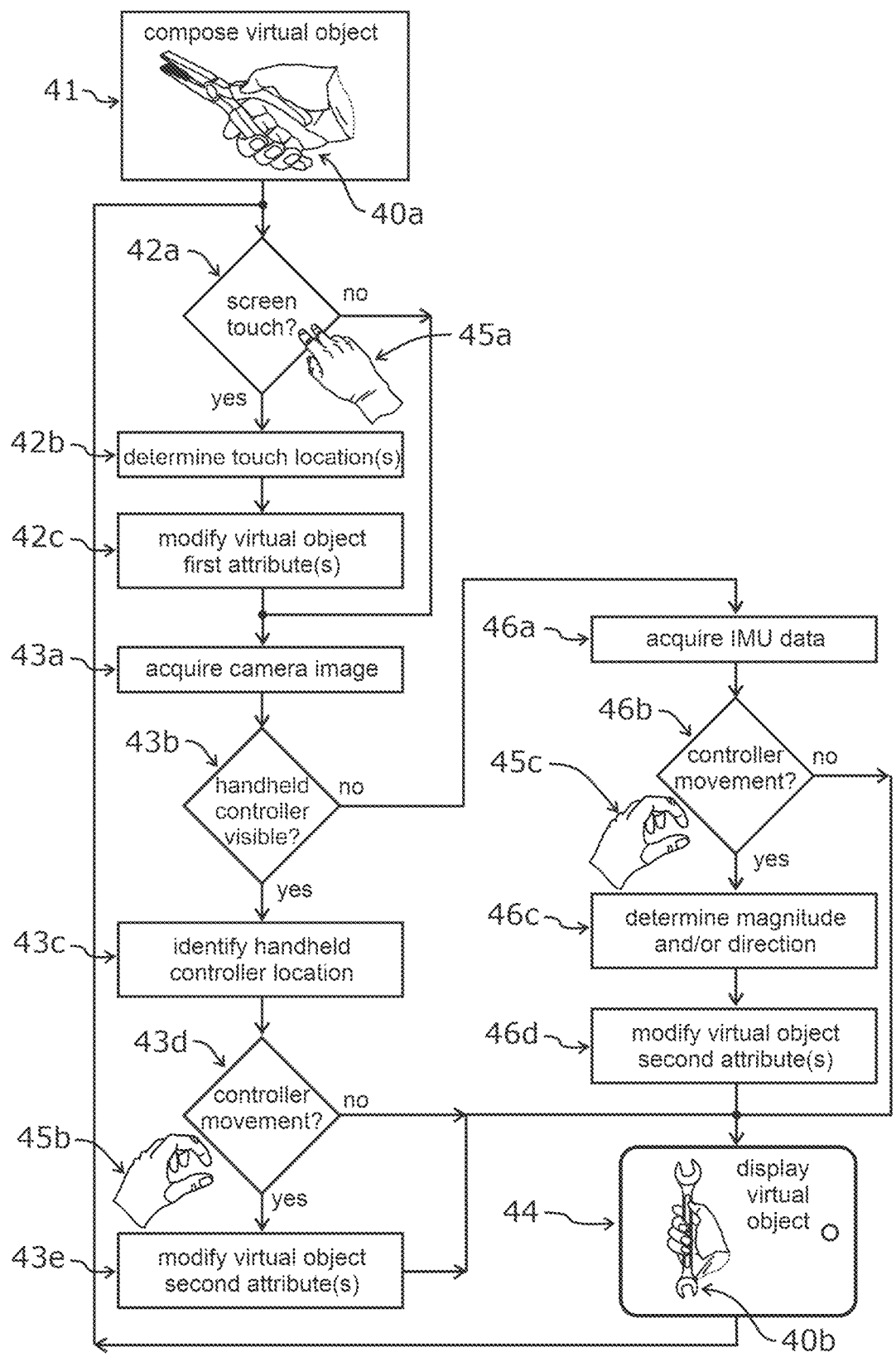
FIG. 4 is a flowchart outlining exemplary steps to acquire collective interactions including selections of virtual tools (e.g., initially starting with a pair of pliers but eventually selecting a wrench) via a touch-sensitive display using two digits of the right hand of one user along with a handheld controller simultaneously manipulated by the left hand of a second user, where camera-based tracking is backed up by IMU measurements when the controller is not visible to the camera.

FIG. 4 is a flowchart that outlines exemplary steps to acquire shared interactions using camera-based tracking of a handheld controller backed up by IMU-based tracking if and/or when camera-trackable controller components are not adequately visible or discernable to the one or more cameras. Camera-based tracking generally provides improved positional accuracy and may additionally provide measurements of controller position relative to other objects within the environment of a user. However, when the handheld controller is not observable by a camera, IMU-based measurements may take over to supply acceleration, velocity, orientation (e.g., relative to the gravitational pull of the earth), positional and/or directional data. IMU-based measurements may possess less positional accuracy, but are generally available at all times.

In FIG. 4, an initial virtual object is composed at 41 (by one or more processors, not shown), e.g., comprising a right hand holding a pair of pliers 40a. Shared control is implemented by first determining the presence of screen touches at 42a by one user. In this exemplary case, the screen is being touched by two fingers of a right hand 45a of a first user. The two digits may, for example, specify a display color, size and rotational orientation of one or more virtual objects. More generally, if one or more digits (or other screen contact mechanisms enacted by the user, such as deploying a stylus) are determined to be in contact with the touch-sensitive display, the one or more locations are determined at 42b by the one or more processors (not shown) and used to modify a first set of attributes of the virtual object(s) at 42c.

Next, a camera image in the region of a second user is acquired at 43a by the one or more processors and a determination is made whether one or more camera-trackable components of the handheld controller are visible at 43b. If not, the system reverts to acquiring IMU measurements at 46a. If the one or more camera-trackable components of the handheld controller are visually trackable, controller location is identified at 43c. Similar to FIG. 2, if movement (i.e., comparing measurements from previous camera images) has occurred at 43d, a second set of the one or more attributes of the one or more virtual objects are modified at 43e.

If the handheld controller is not visually trackable, at 46a, acquired IMU data may be analysed (by the one or more processors, not shown) to determine if there has been substantial movement at 46b. If so, then a determination is made of the magnitude and/or direction of controller motion at 46c which, in turn, may be used to modify the second set of the one or more attributes of the one or more virtual objects at 46d. Regardless of whether display attributes have been determined based on camera- or IMU-based tracking, a resultant virtual object may be displayed on one or more display devices (e.g., tablet, mobile device) at 44 and the overall collective tracking process repeated.

In the interaction shown in FIG. 4, whether tracked by a camera or IMU, a left hand of one user 45b, 45c is being employed to specify a second set of virtual object attributes. During this exemplary interaction (e.g., at selected times and/or using one or more controller push buttons), the selection of an overall virtual object (e.g., from a menu of virtual tools) may be one "attribute" specified using the handheld controller. For example, vertical, horizontal and/or rotational movements of the handheld controller may be used individually or collectively to choose from one or more sets of choices of mechanical tool selections (e.g., from a scroll, rotational menu, grid menu, pop-down selection). In FIG. 4, an initial virtual object assignment of a pair of pliers 40a was modified to that of a wrench 40b at 44. As described above, at 42a, the position and orientation of the wrench may be specified using two-finger hand control 45a via the touch screen to locate and orient the wrench vertically (e.g., to turn a virtual bolt, not shown).

As described in greater detail above, the overall sequence of operations illustrated in FIGS. 2, 3 and 4 includes determining screen touches by one user followed by tracking of the handheld controller (and optionally, any buttons pushed) manipulated by a second user. This sequential order is for illustrative purposes only and is not a necessary sequence or component of system functions. Data acquisition from the different input devices and subsequent processing may be performed in parallel, or in any sequential order. Such processing in a repeated serial fashion (i.e., continuous loop, as illustrated) may occur so quickly that the timing of individual processing steps is not noticeable to any user.

FIGS. 5A and 5B demonstrate the hammering of virtual nails (52a, 52b, 52c, 52d, 52e in FIG. 5A and 54a, 54b, 54c, 54d, 54e in FIG. 5B) into a virtual wooden board (53a in FIG. 5A and 53b in FIG. 5B) in which a finger 51 of the hand 50a of one user is used to select and position (via a touch-sensitive display) each nail to be hammered, while a second user performs the act of hammering each nail via movements of a handheld controller 57. Both the first and second user may view progress during their shared construction project on separate display devices.

At the time shown in the scene in FIG. 5A, one nail 52d is completely hammered into the board 53a, three nails 52a, 52b, 52e have been at least partially nailed into the board 53a, and a fifth nail 52c was created via a screen-touch by the user at the location previously specified by a finger touch. In this scenario, new screen touches at empty board locations results in the formation of new virtual nails (e.g., 52c at location 59). Screen touches at locations already occupied by nails (e.g., by the index finger 51 of the hand 50a of the first user) point to nails (e.g., 52a) to be hammered by the second user via a handheld controller 57.

Camera-based tracking of the handheld controller 57 may be facilitated by three spherical structures 57a, 57b, 57c that are distinct from background (e.g., using internal illumination, distinct coloring, unique reflective patterns). Tracked up-and-down motions 56b performed by the right hand 50b of the user are mirrored by up-and-down motions 56a of the virtual hammer 55 (i.e., ignoring most linear or rotational motions in non-vertical directions by the controller 57 in this exemplary case). In other words, interpretive control is being used to cause the hammer to directly hit each target nail (i.e., lateral movements of the controller do not cause a nail to be missed). Such up-and-down hammering motions cause each target nail to be incrementally driven into the board where distance travelled during each increment may be dependent on maximum downward velocity of the motions 56b during each stroke by the controller 57. Push-button switches 57d, 57e on the handheld controller 57 may be used, for example, to select the type and/or simulated weight of the hammer 55.

The head of each virtual nail cannot be driven through the virtual board 53 (e.g., see 54d). Furthering the realism of the virtual hammering activity, each nail strike may be heard via sounds generated by one or more speakers (not shown) where the volume (and tone) of each nail-strike sound is also dependent on maximum downward velocity of the motions 56b. Additionally, the hammer 55 and/or board 53b may be seen to vibrate briefly following each virtual strike, and results of nails being driven all the way through virtual boards 53 may be seen as nails exiting 58a, 58b the other side of the board 53. In other words, virtual activities may take into account the structural, optical and acoustic properties of the materials being manipulated virtually as well as laws of physics.

FIGS. 6A and 6B show a scene involving the use of virtual screws (62a, 62b, 62c, 62d in FIGS. 6A and 64a, 64b, 64c, 64d in FIG. 6B) to help fasten a virtual wooden board (63a in FIG. 6A and 63b in FIG. 6B) in which the finger 60a of a hand 60 of one user controls and indicates the locations of virtual screws while, at substantially the same time, a hand 61 of a second user controls the rotational movement 66a, 66b of a virtual screwdriver 67 using a handheld controller 65.

At the time shown in the scenario in FIG. 6A, two (Phillips head style) virtual screws 62a, 62d have been completely screwed into the virtual board 63a. Similar to the scene in FIG. 5A, new screen touches at empty board locations result in the formation of new virtual screws (e.g., 62b). Screen touches (i.e., as shown, using an index finger 60a of a left hand 60) at locations occupied by existing screws (i.e., screw 62c at location 67) indicate to one or more other users (see FIG. 6B) which screw may be further screwed in.

Following on with the virtual construction activities by the first user shown in FIG. 6A, FIG. 6B demonstrates collective activities performed by a second user. Tracked rotational motions (e.g., particularly using one or more embedded IMUs, not shown) performed by right-handed manipulation of a handheld controller 65 are mirrored 66a by rotational movements 66b of the virtual screwdriver 67. In this case, linear movements of the handheld controller may be largely ignored and only rotational motions may be sensed and mirrored 66a, 66b by the virtual screwdriver 67. In other words, interpretive control is being used to control virtual screwdriver actions, directing the business-end of the virtual screwdriver to the functional tip of a target screw. Clockwise rotational motions result in the target screw (e.g., 64c) being incrementally driven into the virtual board 63b. Distance driven by a virtual screw during each turning motion may be computed based on rotational distance covered by the handheld controller (i.e., in the clockwise direction) and the pitch of the virtual screw.

Turning motions may be accompanied by a "scratching" sound often associated with the turning of screws (where sound duration may be controlled by the time taken to turn clockwise, and volume and pitch may be correlated with rotational velocity). Counter clockwise movements of the handheld controller may be accompanied by a "ratcheting" sound, emulating the operation of a ratcheting screwdriver that may be set to slip (i.e., not apply force) in one rotational direction (i.e., counter clockwise, in this exemplary case of driving screws into a board). The functional direction of the ratcheting screwdriver 67 may be reversed, for example, using one or both pushbuttons on the handheld controller 67 to reverse the rotational direction in which rotational force is applied, allowing screws to be extracted and/or discarded.

The head of each virtual screw cannot be driven through the virtual board 63 (e.g., see screws 64*a*, 64*d*). Any screws that are sufficiently long to traverse the thickness of a board 63 may be seen protruding from the other side of the board (e.g., 68*a*, 68*b*). In other words, virtual activities may take into account many of the structural, optical and acoustic properties of the materials being handled, in addition to obeying laws of physics during virtual activities.

Taken together, the virtual activities demonstrated in FIGS. 5A, 5B, 6A and 6B may facilitate the construction of complex virtual objects, such as a child's play structure or pet house. Learning such activities in a virtual world, especially by a young child guided by a parent, guardian or grandparent may not only be an enjoyable educational experience, but prepare and lead to the successful planning and construction of such structures in the real world.

The foregoing disclosure of the examples has been presented for purposes of illustration and description. It is not intended to be exhaustive or to limit the invention to the precise forms disclosed. Many variations and modifications of the examples described herein will be apparent to one of ordinary skill in the art in light of the above disclosure. It will be appreciated that the various components and features described with the particular examples may be added, deleted, and/or substituted with the other examples, depending upon the intended use of the examples.

Further, in describing representative examples, the specification may have presented the method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims.

While the invention is susceptible to various modifications, and alternative forms, specific examples thereof have been shown in the drawings and are herein described in detail. It should be understood that the invention is not to be limited to the particular forms or methods disclosed, but to the contrary, the invention is to cover all modifications, equivalents and alternatives falling within the scope of the appended claims.

We claim:

1. A method for two humans to collectively interact with one or more virtual objects, comprising:
    providing in proximity to a first human, a touch-sensitive first display operated by the first human;
    providing in proximity to a second human, a second display, and a handheld controller,
        wherein the handheld controller is operated by the second human and includes one or more inertial measurement units, and
        wherein the touch-sensitive first display, the second display and the handheld controller are all operatively coupled to one or more processors;
    acquiring, by the touch-sensitive first display, one or more touch locations generated by the first human;
    assigning, by the one or more processors, one or more first display attributes of one or more virtual objects based on the one or more touch locations;
    acquiring, by the one or more processors from the one or more inertial measurement units, first acceleration data;
    determining from the first acceleration data, by the one or more processors, one or both of a first acceleration magnitude and a first acceleration direction;
    assigning, by the one or more processors, one or more second display attributes of the one or more virtual objects based on one or both of the first acceleration magnitude and the first acceleration direction; and
    displaying the one or more virtual objects on at least one of the touch-sensitive first display and the second display, using at least one of the first display attributes and at least one of the second display attributes.

2. The method of claim 1, wherein the one or more first display attributes and the one or more second display attributes each comprises one or more of object menu selection, object size, object shape, object display location, one or more locations of one or more object components relative to an object reference location, one or more object colors, one or more object textures, one or more object component line thicknesses, one or more object component line characteristics, object transparency, object orientation relative to one or more edges of a display, object stretch in one or more directions, three-dimensional object viewing perspective, object text labelling, one or more object associated sounds, object rotation, object translation, and one or more characteristics of object movement.

3. The method of claim 2, wherein one of the one or more first display attributes and the one or more second display attributes each comprises an object display location and wherein the object display location is determined by one of:
    aligning the first location with one of a center of a first virtual object of the one or more virtual objects, a predetermined edge of the virtual object, a predetermined reference location of the virtual object, the predetermined reference location of the virtual object offset by a predetermined distance and a predetermined direction, and a rotational center of the virtual object;
    identifying a nearby displayed object located closest to the first location, identifying a predetermined nearby reference location of the nearby displayed object, and displaying the virtual object at the predetermined nearby reference location;
    aligning the one or more touch locations with one of a center of the virtual object, a predetermined edge of the virtual object, a predetermined reference location of the virtual object, the predetermined reference location of the virtual object offset by a predetermined distance and a predetermined direction, and a rotational center of the virtual object; and
    identifying a nearby displayed object located closest to the one or more touch locations, identifying a predetermined nearby reference location of the nearby displayed object, and displaying the virtual object at the predetermined nearby reference location.

4. The method of claim 1, wherein one or more additional first display attributes of the one or more virtual objects are assigned, by the one or more processors, based on one or both of an additional acceleration magnitude and an additional acceleration direction by:

acquiring, by the one or more processors from the one or more inertial measurement units, additional acceleration data; and determining from the additional acceleration data, by the one or more processors, one or both of the additional acceleration magnitude and the additional acceleration direction.

5. The method of claim 1, wherein one or more additional second display attributes of the one or more virtual objects are assigned, by the one or more processors, based on one or more additional touch locations on the touch-sensitive first display contacted by the first human.

6. The method of claim 1, wherein the handheld controller additionally includes one or more switches operated by the second human.

7. The method of claim 6, wherein one or more third display attributes of the one or more virtual objects are assigned, by the one or more processors, based on one or more states of the one or more switches; and the one or more processors display on the one or both of the touch-sensitive first display and the second display, using the one or more first display attributes, the one or more second display attributes, and the one or more third display attributes, the one or more virtual objects.

8. The method of claim 1, wherein the one or more processors are connected via one or more telecommunications links.

9. The method of claim 1, wherein the touch-sensitive first display and second display are the same display.

10. A system for two humans to collectively interact with one or more virtual objects, comprising:

a touch-sensitive first display operable by a first human;
a second display viewable by a second human; and
a handheld controller configured to be operated by the second human,
wherein the handheld controller includes one or more inertial measurement units; and
wherein the touch-sensitive first display, the second display and the handheld controller are all operatively coupled to one or more processors,
the one or more processors configured to:
determine one or more touch locations on the touch-sensitive first display contacted by the first human;
assign one or more first display attributes of one or more virtual objects based on the one or more touch locations;
acquire from the one or more inertial measurement units, first acceleration data;
determine from the first acceleration data, by the one or more processors, one or both of a first acceleration magnitude and a first acceleration direction;
assign one or more second display attributes of the one or more virtual objects based on one or both of the first acceleration magnitude and the first acceleration direction; and
display the one or more virtual objects on at least one of the touch-sensitive first display and the second display, using at least one of the first display attributes and at least one of the second display attributes.

11. The system of claim 10, wherein the one or more first display attributes and the one or more second display attributes each comprises one or more of object menu selection, object size, object shape, object display location, one or more locations of one or more object components relative to an object reference location, one or more object colors, one or more object textures, one or more object component line thicknesses, one or more object component line characteristics, object transparency, object orientation relative to one or more edges of a display, object stretch in one or more directions, three-dimensional object viewing perspective, object text labelling, one or more object associated sounds, object rotation, object translation, and one or more characteristics of object movement.

12. The system of claim 11, wherein one of the one or more first display attributes and the one or more second display attributes each comprises object display location and wherein the object display location is determined by one of:

aligning the first location with one of a center of a first virtual object of the one or more virtual objects, a predetermined edge of the virtual object, a predetermined reference location of the virtual object, the predetermined reference location of the virtual object offset by a predetermined distance and a predetermined direction, and a rotational center of the virtual object;

identifying a nearby displayed object located closest to the first location, identifying a predetermined nearby reference location of the nearby displayed object, and displaying the virtual object at the predetermined nearby reference location;

aligning the one or more touch locations with one of a center of the virtual object, a predetermined edge of the virtual object, a predetermined reference location of the virtual object, the predetermined reference location of the virtual object offset by a predetermined distance and a predetermined direction, and a rotational center of the virtual object; and identifying a nearby displayed object located closest to the one or more touch locations, identifying a predetermined nearby reference location of the nearby displayed object, and displaying the virtual object at the predetermined nearby reference location.

13. The system of claim 10, wherein one or more additional first display attributes of the one or more virtual objects are assigned, by the one or more processors, based on one or both of an additional acceleration magnitude and an additional acceleration direction by:

acquiring, by the one or more processors from the one or more inertial measurement units, additional acceleration data; and determining from the additional acceleration data, by the one or more processors, one or both of the additional acceleration magnitude and the additional acceleration direction.

14. The system of claim 10, wherein one or more additional second display attributes of the one or more virtual objects are assigned, by the one or more processors, based on one or more additional touch locations on the touch-sensitive first display contacted by the first human.

15. The system of claim 10, wherein the handheld controller additionally includes one or more switches operated by the second human.

16. The system of claim 15, wherein one or more third display attributes of the one or more virtual objects are assigned, by the one or more processors, based on one or more states of the one or more switches; and the one or more processors display on the one or both of the touch-sensitive first display and the second display, using the one or more first display attributes, the one or more second display attributes, and the one or more third display attributes, the one or more virtual objects.

17. The system of claim 10, wherein the one or more processors are connected via one or more telecommunications links.

18. The system of claim 10, wherein the touch-sensitive first display and second display are the same display.

19. A method for two humans to collectively interact with one or more virtual objects, comprising:
provides in proximity to a first human, a touch-sensitive first display operated by the first human;
providing in proximity to a second human, a second display and a controller,
wherein the controller is affixed to the second human and includes one or more inertial measurement units, and
wherein the touch-sensitive first display, the second display and the controller are all operatively coupled to one or more processors;
acquiring, by the touch-sensitive first display, one or more touch locations generated by the first human;
assigning, by the one or more processors, one or more first display attributes of one or more virtual objects based on the one or more touch locations;
acquiring, by the one or more processors from the one or more inertial measurement units, first acceleration data;
determining from the first acceleration data, by the one or more processors, one or both of a first acceleration magnitude and a first acceleration direction;
assigning, by the one or more processors, one or more second display attributes of the one or more virtual objects based on one or both of the first acceleration magnitude and the first acceleration direction; and
displaying the one or more virtual objects on at least one of the touch-sensitive first display and the second display, using at least one of the first display attributes and at least one of the second display attributes.

20. The method of claim 19, wherein the controller is affixed to one of an arm, a leg, a foot, and a head of the second human.

21. The method of claim 19, wherein the controller additionally includes one or more switches operated by pushing the controller against a static object.

22. The method of claim 19, wherein the touch-sensitive first display and second display are the same display.

23. The method of claim 19, wherein the one or more processors are connected via one or more telecommunications links.

24. The method of claim 19, wherein the one or more first display attributes and the one or more second display attributes each comprises one or more of object menu selection, object size, object shape, object display location, one or more locations of one or more object components relative to an object reference location, one or more object colors, one or more object textures, one or more object component line thicknesses, one or more object component line characteristics, object transparency, object orientation relative to one or more edges of a display, object stretch in one or more directions, three-dimensional object viewing perspective, object text labelling, one or more object associated sounds, object rotation, object translation, and one or more characteristics of object movement.

25. The method of claim 19, wherein one or more additional first display attributes of the one or more virtual objects are assigned, by the one or more processors, based on one or both of an additional acceleration magnitude and an additional acceleration direction by:
acquiring, by the one or more processors from the one or more inertial measurement units, additional acceleration data; and
determining from the additional acceleration data, by the one or more processors, one or both of the additional acceleration magnitude and the additional acceleration direction.

* * * * *